(12) United States Patent
Börret et al.

(10) Patent No.: US 11,339,007 B2
(45) Date of Patent: May 24, 2022

(54) SWITCH DEVICE

(71) Applicant: BAUSCH + STRÖBEL MASCHINENFABRIK ILSHOFEN GMBH + CO. KG, Ilshofen (DE)

(72) Inventors: Florian Börret, Gaildorf (DE); Svenja Dollinger, Blaufelden (DE); Klaus Kaiser, Obersontheim/Hausen (DE); Jürgen Munz, Obersontheim (DE); Daniel Spieler, Crailsheim (DE)

(73) Assignee: BAUSCH + STRÖBEL MASCHINENFABRIK ILSHOFEN GMBH + CO. KG, Ilshofen (DE)

(*) Notice: Subject to any disclaimer, the term of this patent is extended or adjusted under 35 U.S.C. 154(b) by 0 days.

(21) Appl. No.: 16/959,226

(22) PCT Filed: Feb. 25, 2019

(86) PCT No.: PCT/EP2019/054580
§ 371 (c)(1),
(2) Date: Jun. 30, 2020

(87) PCT Pub. No.: WO2019/219253
PCT Pub. Date: Nov. 21, 2019

(65) Prior Publication Data
US 2021/0371210 A1 Dec. 2, 2021

(30) Foreign Application Priority Data
May 14, 2018 (DE) .................. 10 2018 207 420.8

(51) Int. Cl.
*B65G 47/48* (2006.01)
*B65G 47/64* (2006.01)
*B65G 47/84* (2006.01)

(52) U.S. Cl.
CPC .......... *B65G 47/485* (2013.01); *B65G 47/64* (2013.01); *B65G 47/846* (2013.01)

(58) Field of Classification Search
CPC .... B65G 47/485; B65G 47/64; B65G 47/846; B65G 47/766
See application file for complete search history.

(56) References Cited

U.S. PATENT DOCUMENTS 4,125,184 A 11/1978 Seragnoli
6,446,781 B1 9/2002 De Villele

FOREIGN PATENT DOCUMENTS

CN 106364899 A 2/2017
DE 102013223977 A1 5/2015
(Continued)

OTHER PUBLICATIONS

International Application No. PCT/EP2019/054580, "International Search Report and Written Opinion", dated Jun. 4, 2019, 14 pages.
(Continued)

*Primary Examiner* — William R Harp
(74) *Attorney, Agent, or Firm* — Kilpatrick Townsend & Stockton LLP

(57) ABSTRACT

The present disclosure relates to a switch device for a transfer point between a first and a second rotatable star wheel, at which transfer point objects can be selectively transferred from the first star wheel to the second star wheel, comprising a two-walled first switch element, the first and second walls of which extend around the transfer point such that a passage for the objects is formed therebetween; a second and a third switch element, which are arranged and held such that they each form extensions of the first and second wall, respectively, of the first switch element in the first position and the second position of the first switch
(Continued)

element; and a transition device, which is designed to carry out the transition of the first to third switch elements.

16 Claims, 2 Drawing Sheets

(56) References Cited

FOREIGN PATENT DOCUMENTS

| | | | |
|---|---|---|---|
| DE | 102016200150 A1 * | 7/2017 | ........... B65G 47/846 |
| WO | 0130674 A1 | 5/2001 | |
| WO | 2015074801 A1 | 5/2015 | |

OTHER PUBLICATIONS

Indian Application No. 202017010524, First Examination Report (FER) dated Mar. 17, 2022, 6 pages.

* cited by examiner

SWITCH DEVICE

CROSS-REFERENCE TO RELATED APPLICATIONS

This application is a U.S. national phase of International Patent Application No. PCT/EP2019/054580 filed on Feb. 25, 2019, which claims the benefit of Germany Patent Application No. 102018207420.8, filed on May 14, 2018, the contents of both are incorporated herein by this reference.

DESCRIPTION

The present application relates to a switch device for a transfer point between a first and a second rotatable star wheel, at which transfer point objects can be selectively transferred from the first star wheel to the second star wheel.

It should be noted that the term "star wheel" is to be interpreted broadly in the entire present invention, such that it is intended to mean not only strictly circular transport units, but also transport units of which the outer peripheral shape deviates from a circle and, for example, are flattened in portions or have differently convex portions. In extreme cases, this could even include completely straight transport units, which can be considered to be "wheels" having an infinite diameter, in which case transfer from a linear transport unit to a circular transport unit, for example, can be provided and is also intended to be covered by the present application. In any case, other than switch devices which are used to transfer objects to a star wheel or to transfer them from the star wheel to another transport device, devices such as guide rails are to be provided, at least in convex portions, by means of which devices the objects are held on the corresponding star wheel.

The switch devices in question are used, inter alia, in the packaging industry and also, for example, in the chemical and pharmaceutical industries, in order to be able to separate objects according to their characteristics, i.e. to be able to sort individual objects from a series of similar objects, for example if they are defective or the like. Such objects that have been identified as defective can then, for example, be supplied to another path downstream of a device which has detected the defectiveness of the particular object. For this purpose, objects are guided on the outer periphery of the above-mentioned star wheels and optionally transferred from a first star wheel, from which they are delivered to a corresponding transfer point, to a second star wheel at this point, from which second star wheel they are moved to another path, or they remain on the first star wheel, in order to then also be removed from the transfer point. It goes without saying that the term "transfer point" is not intended to be understood in strictly geometric terms in this case, but rather that the transfer can also take place on an extended strip-like region along the movement of the objects.

For this purpose, various switch devices are already known from the prior art, for example vacuum wheels, in which the objects are held on the outer periphery of the respective star wheels by means of vacuum grippers, which can then be selectively switched such that, at the transfer point, a corresponding object either remains on the first vacuum star wheel or is transferred to a second vacuum star wheel, such that the object can subsequently be removed on a desired path. Although such vacuum-operated switch devices work reliably and can be safely operated at the respective star wheels even with a relatively small object spacing, they cannot always be used in clean rooms or in an isolator, since from a pharmaceutical point of view, for example, the highly sensitive objects and their contents could be contaminated due to possible external contamination from components such as hoses, vacuum pumps, valves, etc.

In many applications for generic switch devices of this kind, therefore, only mechanical switches can be used, as known from DE 10 2013 223 977 A1 for example. This document discloses a device which, between two star wheels, fulfils a switch function at a transfer point and comprises for this purpose a one-piece pivotable element having a guide means for the objects supported by the star wheels, which element is pivotable such that either the objects remain on the first star wheel or the objects are transferred to the second star wheel. Nevertheless, in order to ensure sufficient guiding of the objects, the guide element mentioned is relatively long, and therefore can reliably prevent the objects from tilting during transfer. However, this also achieves relatively high inertia of the switch function, because in order to be able to select successive objects effectively at all, only a single object may be inside the guide device at a time. Therefore, a minimum distance between two objects on the star wheels is automatically fixed by the length of the guide element, such that in this case relatively large distances and therefore a relatively low throughput of objects for each unit of time at a predetermined rotational speed of the star wheels must be provided. This is clearly at the expense of the efficiency of the installation, making it more expensive to operate, whereas the present invention is intended to allow a safe switch function at a higher rotational speed of the star wheels and with smaller object distances, which entails a higher output capacity of the system.

The problem addressed by the present invention is therefore that of providing a switch device of the type in question which operates purely mechanically and therefore can be also used in environments in which vacuum-operated switches cannot be used due to the risk of contamination, and which also allows a significantly higher number of cycles, in comparison with previously known devices of the type in question, without the rotational speed of the star wheels needing to be increased for this purpose.

In order to achieve this problem, the switch device according to the invention comprises a two-walled first switch element, the first and second walls of which extend around a transfer point such that a passage for the objects is formed therebetween, the first switch element being displaceably held between a first position and a second position, objects entering the passage of the first switch element remaining on the first star wheel in the first position and objects entering the passage being transferred to the second star wheel in the second position; a second and a third switch element, which are arranged and held such that they each form extensions of the first and second wall, respectively, of the first switch element in the first position and the second position of the first switch element and, for this purpose, can also be displaced between respective first and second positions; and a transition device, which is designed to carry out the transition of the first to third switch elements, by the transition from the relevant first position into the relevant second position being produced such that first transition of the first and third switch elements is initiated and then transition of the second switch element is initiated, and by the transition from the relevant second position into the relevant first position being produced such that first transition of the first and second switch elements is initiated and then transition of the third switch element is initiated.

Owing to this at least three-part design of the switch device according to the invention with two possible working positions for selectively allocating the objects to the first or second star wheel, it is possible to begin a transition of the first and third switch elements from their respective first positions into their respective second positions, for example, when another object is located on the first star wheel in the region of the second switch element, which object has remained on said first star wheel in an earlier selection step.

The subsequent transition of the second switch element is therefore initiated only when the above-mentioned object from an earlier selection process has been rotated further with the rotation of the first star wheel to a sufficient extent, so that the second switch element is located behind said object. The same applies to the transition of the individual switch elements from their respective second positions into their respective first positions; in this case, first the transition of the first and second switch elements is initiated and then the transition of the third switch element is initiated. As the transition in particular of the first switch element is initiated at a point in time at which another object from an earlier selection process is located in the region of one of the downstream switch elements, the distance between the individual objects on the peripheries of the star wheels can be reduced, as a result of which the present invention allows higher rotational speeds of the star wheels and smaller object distances, which can in turn achieve a higher output capacity and therefore more efficient operation of such a switch device in comparison with the devices known from the prior art and described above.

At this point, it should merely be noted that, for example in the case of transition from the first position into the second position, there may be a slight delay between initiating the transition of the first and third switch elements, respectively, so that the transition movements of said elements do not necessarily need to begin absolutely simultaneously. In this case, such fine adjustments fall within the scope of a person skilled in the art and can depend on the actual design of the entire installation, in which case parameters such as the peripheries of the star wheels can be considered, for example. In any case, however, there should be a noticeable time interval between the initiation of the chronologically first two transition movements in each case of switch elements and the initiation of the transition of the chronologically subsequent switch element in order to achieve the effect according to the invention.

In addition, the first and second walls of the first switch element can be designed so as to be individually displaceable and the transition device can be designed to individually displace the two walls. This may be advantageous in particular in applications in which the geometries of the objects to be transported deviate from purely circular cross sections, and therefore in this case the transition of the first switch element between its two possible positions also does not take place integrally, but rather sequentially with respect to its two walls.

Furthermore, a greater number of switch elements than three may also be provided, for example additional fourth and fifth switch elements, which in turn form extensions of the second and third switch elements, respectively, in their corresponding working positions. In this case, the optimum number of switch elements can correspond to the geometric characteristics of the objects to be transported, just as the size and shape of the individual switch elements can also be selected depending on the object characteristics.

In an exemplary embodiment, the transition device can be designed to carry out the transition in each case of the first to third switch elements, and optionally further switch elements, by means of pivoting about a common pivot axis. Such a design corresponds to the desired geometry of the guide path for the objects formed by the switch elements and is therefore a preferred selection. As an alternative to such pivoting, however, there may be a more complex transition of the individual switch elements between their respective working positions, for example if the geometry of the entire installation requires this. In this case, combined rotational and translatory movements, for example, could be considered.

As a further measure for reducing the possible distances between the objects on the peripheries of the two star wheels, the separating line between the first wall of the first switch element and the second switch element and/or the separating line between the second wall of the first switch element and the third switch element can extend obliquely to the direction of extension of the wall in each case, in particular following a circular arc, such that the switch elements can move unhindered with respect to one another. Since the first switch element can, in this way, pivot into an undercut behind a downstream object, the space provided on the peripheries of the star wheels between the objects can be filled by the first switch element at the earliest possible point in time, so that, as already mentioned, the distance between the objects on the star wheels can be further reduced.

In a possible embodiment, each of the first to third switch elements can be assigned an individual drive device for its transition between the first and second positions in each case, which drive devices can be operated in a coordinated manner by the transition device. In this case, at least one of the drive devices, preferably all of the drive devices, can comprise at least one electric drive, in particular a servomotor, or a pneumatic drive, for example. Such electric servomotors mentioned by way of example have recently become available on the market at very low cost and operate with excellent precision, and are therefore highly suitable for the above-mentioned problem. However, it would also be possible, for example, to provide only a single drive motor for the plurality of switch elements, in which case mechanical deflecting and control devices would need to be provided.

According to a further aspect, the present invention relates to a transport device for objects, in particular cylindrical objects such as bottles and/or ampoules, comprising a first and a second rotatable star wheel, which are arranged such that a transfer point is formed therebetween, and to a switch device according to the invention for selectively transferring objects from the first star wheel to the second star wheel. In this case, the transition device can be operatively coupled to a control device for the two star wheels such that the transition of the switch elements is adapted or can be adapted to the rotational speed of the star wheels.

In this case, the operative coupling of the transition device to the control device is understood to mean that said control device can of course also be formed by a single electronic component, such as a microcontroller, or that both functionalities can be integrated in a higher-level control system for an entire installation.

Finally, the transport device according to the invention can be designed such that it further comprises a base on which the objects are transported, the switch elements not having bases. The geometric design of this base can in turn be adapted if necessary to the geometry of the objects to be transported. In this way, the objects can be supported on said base whilst being transported by the transport device, whereas the switch elements are located above this base and therefore come into contact with the individual objects only laterally. This prevents possible tilting of the objects, which could occur if the switch elements themselves were to have a base, as in this way the base of the transport device can be completely level and can be designed without functional elements for guiding the objects.

Finally, it should also be noted that the transport device according to the invention can be modular, in order to be adaptable to different geometries and dimensions of the objects to be transported. For this purpose, for example, a system consisting of a plurality of pairs of star wheels, which are each matched to a type of object, and an associated switch device in each case can be provided, which is also matched to the corresponding objects in terms of the number of its switch elements and its geometries as well as its actuation. Therefore, in the event that the type of objects to be transported is to be changed during operation of the installation, the star wheels and the switch device can be replaced at the same time, while other components such as drives and feed or discharge devices for the objects can remain unchanged.

BRIEF DESCRIPTION OF THE DRAWINGS

Further features and advantages of the present invention are clear from the following description of an embodiment when considered in conjunction with the accompanying drawings. In the individual drawings:

FIGS. 1 to 3 are each a plan view of a transport device according to the invention for objects, which transport device is very generally provided with the reference sign 10. The drawings also each show eight of said objects, which are provided with the reference signs B1 to B8. The objects B1 to B8 can be, for example, bottles, ampoules or other substantially cylindrical objects, although objects having other cross sections would also be transportable if minor changes were made to the geometry of the device 10.

In order to transport these objects B1 to B8, the transport device 10 comprises a first and a second star wheel 20 and 30, which each have recesses 22 and 32 on their peripheries, the shape of which recesses corresponds to the outer shape of the objects B1 to B8, and which are spaced apart at regular intervals, each corresponding to angles α with respect to the entire periphery of the respective star wheels 20 and 30. In order to hold the objects B1 to B8 in the recesses 22 and 32, guide rails (not shown for reasons of clarity) are also provided, which substantially follow the shape of the outer peripheries of the star wheels at a suitable distance.

Figure 1:
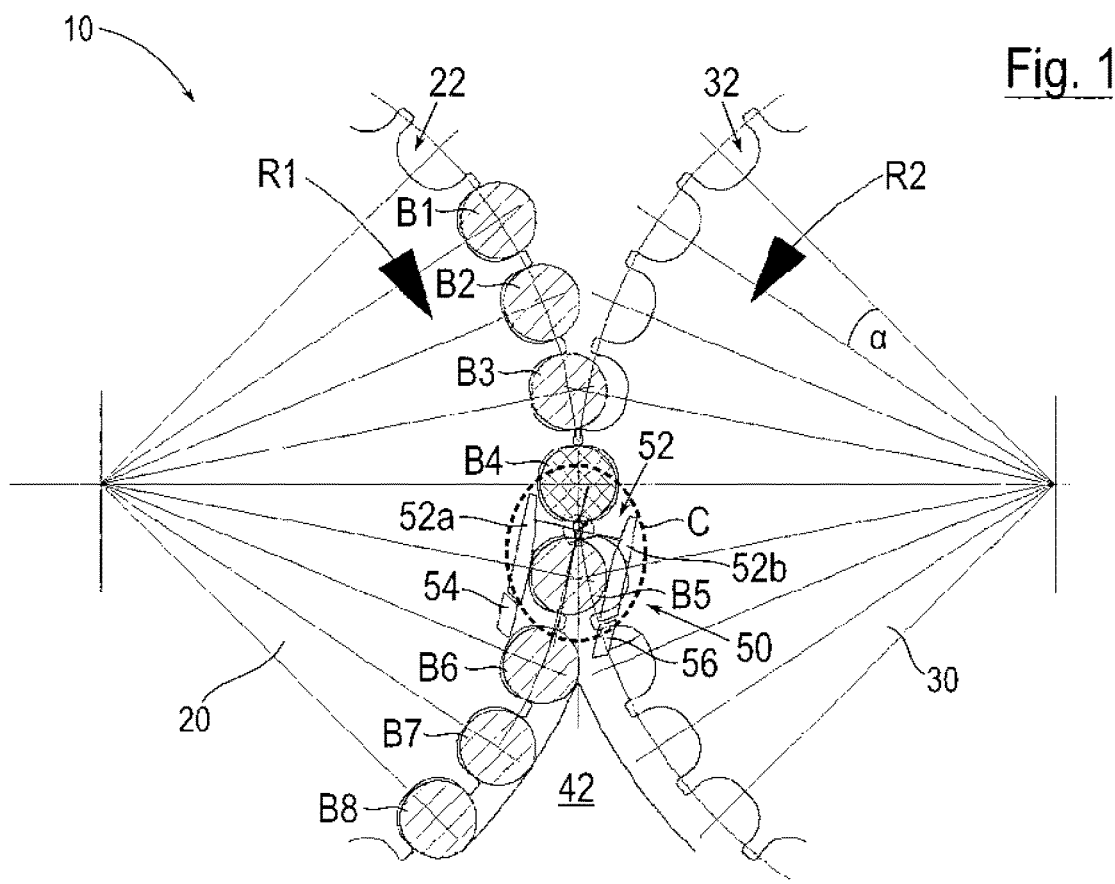
FIG. 1 is a plan view of a transport device according to the invention having a switch device according to the invention in a first working position.
Figure 2:
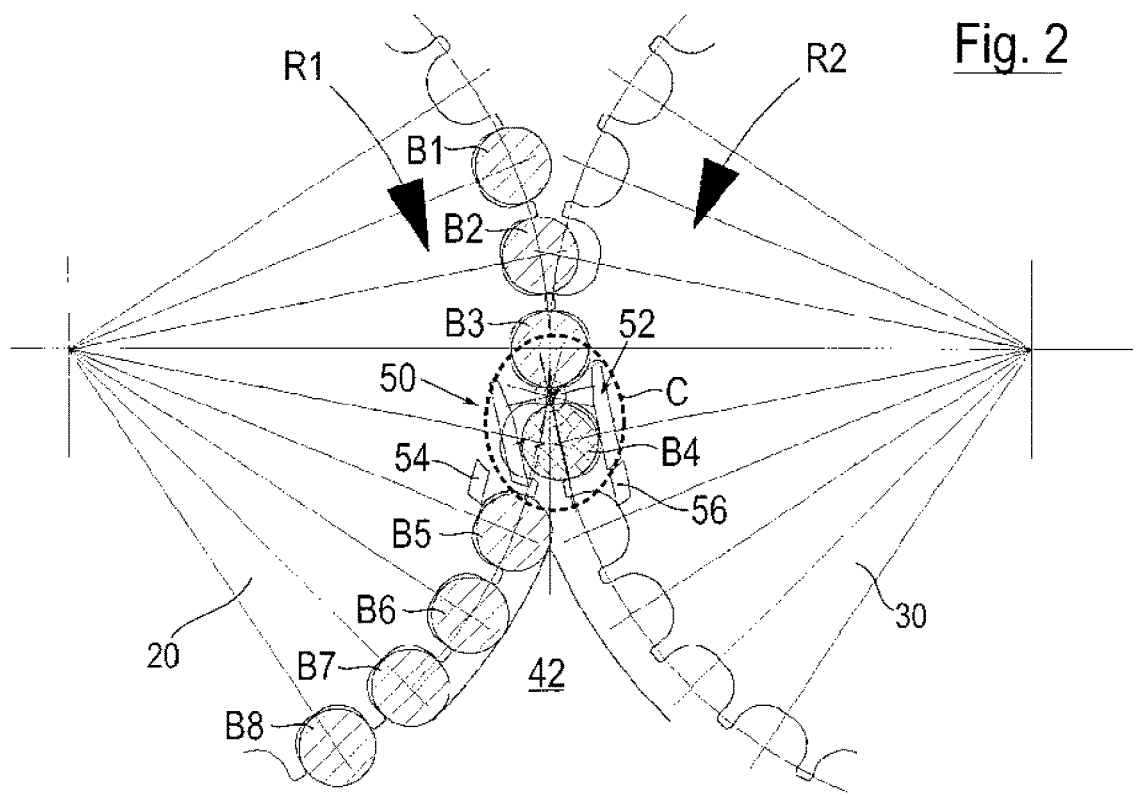
FIG. 2 shows the device from FIG. 1 during transfer into a second working position.
Figure 3:
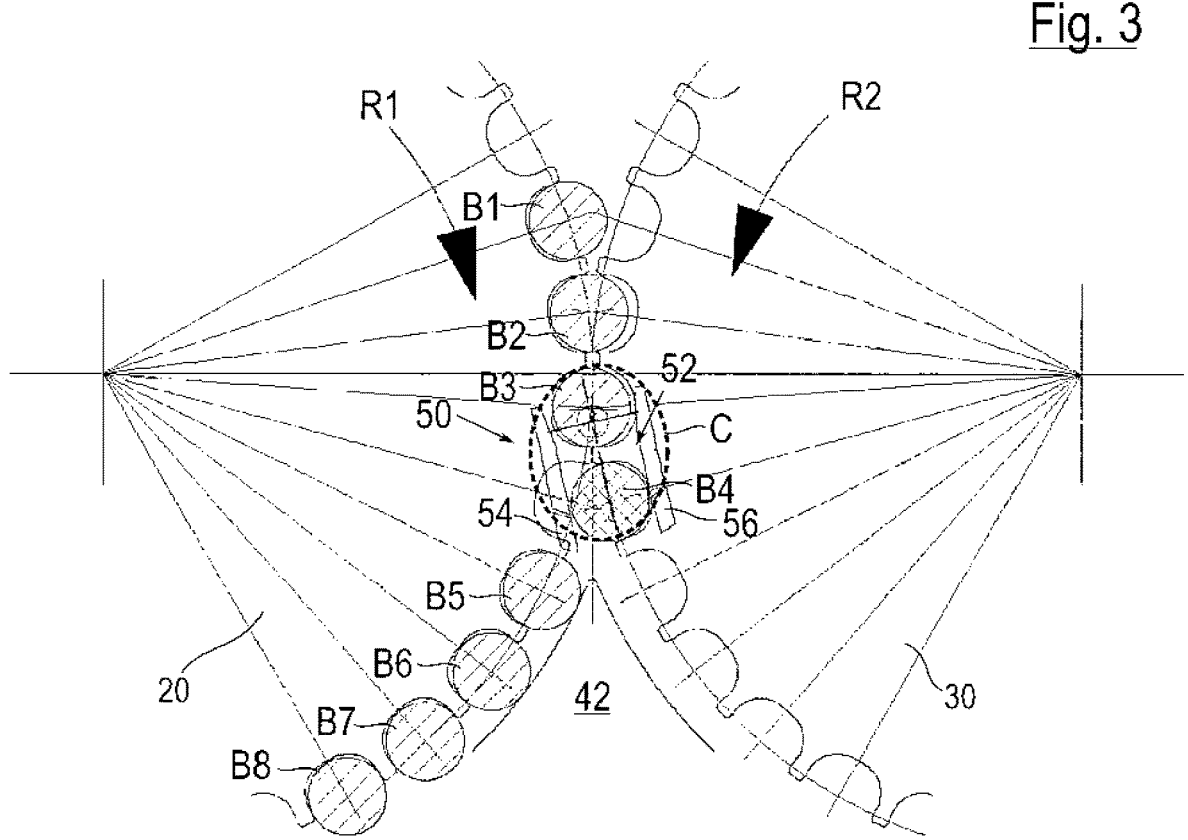
FIG. 3 shows the device from FIGS. 1 and 2 in the second working position.

Furthermore, in each of FIGS. 1 to 3, the direction of rotation of the two star wheels 20 and 30 is shown by means of appropriate arrows and provided with the reference signs R1 and R2. In this case, the first star wheel 20 rotates clockwise and the second star wheel 30 rotates counterclockwise, the series of objects B1 to B8 being correspondingly guided from the first star wheel 20 to the second star wheel 30. In the region of the smallest distance between the two star wheels 20 and 30, a transfer point C is therefore provided, at which the objects B1 to B8 are inserted to the same extent into corresponding recesses 22 and 32 of the first and second star wheels 20 and 30, respectively. The term "transfer point" is not to be understood in strictly geometric terms in this case, and therefore the region C in FIGS. 1 to 3 is oval.

Finally, FIGS. 1 to 3 also show a guide element 42, which extends in the shape of a triangle behind the transfer point C in the direction of movement of the objects B1 to B8, such that objects B1 to B8 transported both from the first star wheel 20 and from the second star wheel 30 are guided by said guide element and are therefore held on the corresponding star wheel.

In order to then be able to selectively transfer the objects B1 to B8 from the first star wheel 20 to the second star wheel 30 at the transfer point C, a switch device 50 according to the invention is provided in the region of the transfer point C, which switch device comprises a first, a second and a third switch element 52, 54, 56. In this case, the individual switch elements 52 to 56 are substantially formed by wall portions which extend into the drawing plane in FIGS. 1 to 3, are perpendicular with respect to the planes of the star wheels, and along which the objects B1 to B8 guided by the star wheels 20 and 30 can be guided through the passages formed by said wall portions.

In this case, the first switch element 52 comprises two walls 52a and 52b, which each extend on one side of the objects B1-B8 in the direction of movement of the objects, the second switch element 54 forming an extension of the first wall 52a of the first switch element 52 and the third switch element 56 forming an extension of the second wall 52b of the first switch element 52 in the working positions in FIGS. 1 and 3. For this purpose, the separating lines between the corresponding first and second wall parts 52a and 52b of the first switch element 52 on the one hand and the second and third switch elements 54 and 56 on the other hand are each drawn following circular arcs, which leads to the advantageous effect, described in the following in connection with FIG. 2, of an even smaller possible distance between the objects B1 to B8 on the star wheels and allows unhindered movement of the switch elements 52, 54 and 56 with respect to one another.

Firstly, the switch elements 52, 54 and 56 are located in their respective first positions in FIG. 1, however, and therefore the switch device 50 is in a first working position. In this case, the first wall 52a of the first switch element 52 and the second switch element 54 on the one hand and the second wall 52b of the first switch element 52 and the third switch element 56 on the other hand form a passage, through which the objects B1 to B8 are guided, in which case, due to the relative orientation of the switch device and the two star wheels 20 and 30, the objects B1 to B8 remain on the first star wheel 20 in this working position of the switch device 50.

If it is then established that one of the objects, for example the object B4, is to be transferred to the second star wheel 30, for example because it has been established in an earlier working step that this object B4 is damaged and must therefore be discarded, a transition device (not shown), in cooperation with a relevant drive (also not shown), for example an electric servomotor, initiates for the first to third switch elements 52, 54 and 56 a transition of the switch device 50 into the second working position shown in FIG. 3, in which position the switch device is oriented with respect to the first and second star wheels 20 and 30 such that the object B4 is transferred to the second star wheel 30.

In this case, there is no common transition of the three switch elements 52, 54 and 56, as can be seen in FIG. 2, but instead the first and third switch elements 52 and 56 are initially moved into their respective second positions by means of a pivot movement, while the second switch element 54 initially remains in its first position. It should be noted again at this point that, in addition to the pivot movement of the switch elements used in the present embodiment, other forms of movement would also be conceivable, such as a combined rotational and translatory movement. It should also be recalled that the pivot movements of the first and third switch elements 52 and 56 do not need to begin strictly simultaneously, but rather there may also be a delay between the first and third switch elements 52 and 56 depending on the geometry of the objects.

As can be seen in FIG. 2, at the time of initiation of the pivot movement of the first and third switch elements 52 and 56, the object B5 is still in the region of the second switch element 54, so that pivoting of this second switch element 54 is still not possible at this point in time, while in contrast the first switch element 52 and the third switch element 56 can already be freely pivoted, which is made possible in particular by the defined geometry of the separating line between the first and second switch elements 52 and 54 in the form of a circular arc, as this allows the end of the first switch element 52 that is at the front in the direction of movement of the objects B1 and B8 to pivot into the space between the object B4 and the object B5.

This achieves a significantly reduced distance between the objects B4 and B5, for example, on the peripheries of the star wheels 20 and 30 in comparison with known devices, as a result of which the present switch device can achieve significantly higher numbers of cycles and operating speeds without the rotational speed of the star wheels needing to be increased, which could also lead to disadvantages.

It goes without saying that the repeated transition of the second working position of the switch device 50 shown in FIG. 3 into the first position of the switch device 50 shown in FIG. 1 takes place in a similar, yet inverse manner, such that in this case the first switch element 52 and the second switch element 54 are initially moved into their respective first positions synchronously (or with minimal time delay) and the third switch element 56 initially remains in its second position, and the third switch element 56 is finally also moved back into its first position only when a corresponding downstream object is rotated out of the region of the third switch element 56 by the second star wheel 30, such that the first working position in FIG. 1 of the switch device 50 is ultimately assumed again.

The invention claimed is:

1. Switch device for a transfer point between a first star wheel and a second star wheel, at which transfer point objects are selectively transferrable from the first star wheel to the second star wheel, wherein the switch device comprises:
a two-walled first switch element, the first and second walls of which extend around the transfer point such that a passage for the transfer point objects is formed therebetween;
the first switch element being displaceably held between a first position and a second position, objects entering the passage of the first switch element remaining on the first star wheel in the first position and objects entering the passage being transferred to the second star wheel in the second position;
a second and a third switch elements, which are arranged and held such that they each form extensions of the first and second wall, respectively, of the first switch element in the first position and the second position of the first switch element displaceably between respective first and second positions; and
a transition device, which is designed to carry out the transition of the first to third switch elements, by:
a) the transition from a relevant first position into a relevant second position being produced such that first transition of the first and third switch elements is initiated, optionally with a slight time delay, and then transition of the second switch element is initiated; and
b) the transition from the relevant second position into the relevant first position being produced such that first transition of the first and second switch elements is initiated, optionally with a slight time delay, and then transition of the third switch element is initiated.

2. Switch device according to claim 1, wherein the first and second walls of the first switch element are designed so as to be individually displaceable and the transition device is designed to individually displace the two walls.

3. Switch device according to claim 1, comprising additional fourth and fifth switch elements, which in turn form extensions of the second and third switch elements, respectively, in corresponding working positions.

4. Switch device according to claim 1, wherein the transition device is designed to carry out the transition in each case of the first to third switch elements, and optionally further switch elements, by means of pivoting about a common pivot axis.

5. Switch device according to claim 1, wherein a separating line between the first wall of the first switch element and the second switch element and/or between the second wall of the first switch element and the third switch element extends obliquely to a direction of extension of the wall in each case.

6. Switch device according to claim 1, wherein each of the first to third switch elements is assigned an individual drive device for its transition between the first and second positions in each case, which drive devices are operated in a coordinated manner by the transition device.

7. Switch device according to claim 6, wherein at least one of the drive devices comprises at least one electric drive or a pneumatic drive.

8. Transport device for objects comprising a first and a second rotatable star wheel, which are arranged such that a transfer point is formed therebetween, and a switch device, the switch device comprising:
a two-walled first switch element, the first and second walls of which extend around the transfer point such that a passage for the objects is formed therebetween;
the first switch element being displaceably held between a first position and a second position, objects entering the passage of the first switch element remaining on a first star wheel in the first position and objects entering the passage being transferred to a second star wheel in the second position;
a second and a third switch elements, which are arranged and held such that they each form extensions of the first and second wall, respectively, of the first switch element in the first position and the second position of the first switch element displaceably between respective first and second positions; and
a transition device, which is designed to carry out the transition of the first to third switch elements, by:
a) the transition from a relevant first position into a relevant second position being produced such that first transition of the first and third switch elements is initiated, optionally with a slight time delay, and then transition of the second switch element is initiated; and b) the transition from the relevant second position into the relevant first position being produced such that first transition of the first and second switch elements is initiated, optionally with a slight time delay, and then transition of the third switch element is initiated.

9. Transport device according to claim 8, wherein the transition device is operatively coupled to a control device for the first star wheel and the second star wheels such that the transition of the switch elements is adapted to the rotational speed of the first star wheel and the second star wheels.

10. Transport device according to claim 8, further comprising a base on which the objects are transported, the switch elements not having bases.

11. Transport device according to claim 8, wherein the first and second walls of the first switch element are designed so as to be individually displaceable and the transition device is designed to individually displace the two walls.

12. Transport device according to claim 8, comprising additional fourth and fifth switch elements, which in turn form extensions of the second and third switch elements-, respectively, in the corresponding working positions.

13. Transport device according to claim 8, wherein the transition device is designed to carry out the transition in each case of the first to third switch elements, and optionally further switch elements, by means of pivoting about a common pivot axis.

14. Transport device according to claim 8, wherein a separating line between the first wall of the first switch element and the second switch element and/or between the second wall of the first switch element and the third switch element extends obliquely to the direction of extension of the wall in each case.

15. Transport device according to claim 8, wherein each of the first to third switch elements is assigned an individual drive device for its transition between the first and second positions in each case, which drive devices are operated in a coordinated manner by the transition device.

16. Switch device according to claim 15, wherein at least one of the drive devices comprises at least one electric drive or a pneumatic drive.

* * * * *